(12) United States Patent
Choi

(10) Patent No.: US 8,814,367 B2
(45) Date of Patent: Aug. 26, 2014

(54) 3D IMAGE CINEMA SYSTEM

(76) Inventor: Hae-Yong Choi, Seoul (KR)

( * ) Notice: Subject to any disclaimer, the term of this patent is extended or adjusted under 35 U.S.C. 154(b) by 168 days.

(21) Appl. No.: 13/340,744

(22) Filed: Dec. 30, 2011

(65) Prior Publication Data

US 2012/0188513 A1 Jul. 26, 2012

(30) Foreign Application Priority Data

Jan. 21, 2011 (KR) ........................ 10-2011-0006109

(51) Int. Cl.
*G03B 21/14* (2006.01)
*G02B 27/22* (2006.01)

(52) U.S. Cl.
USPC ............ 353/94; 353/79; 353/8; 52/8; 352/40; 352/134

(58) Field of Classification Search
USPC ......... 352/40, 69, 134; 52/6, 8, 9; 353/79, 94, 353/71, 82; 359/449
See application file for complete search history.

(56) References Cited

U.S. PATENT DOCUMENTS

| 1,681,723 | A | * | 8/1928 | Clas .............................. 352/134 |
| 3,293,807 | A | * | 12/1966 | Ramsell ............................. 52/6 |
| 3,313,068 | A | * | 4/1967 | Pinto .................................. 52/8 |
| 6,918,671 | B2 | * | 7/2005 | Moffatt ........................... 353/82 |
| 7,344,254 | B2 | * | 3/2008 | Yoon ............................... 353/81 |
| 8,177,366 | B2 | * | 5/2012 | Lee et al. .......................... 353/7 |
| 2003/0131537 | A1 | * | 7/2003 | Krikorian et al. ................... 52/6 |
| 2008/0074625 | A1 | * | 3/2008 | Lai et al. ......................... 353/82 |
| 2012/0206697 | A1 | * | 8/2012 | Lee ................................. 353/82 |

* cited by examiner

*Primary Examiner* — William C Dowling
(74) *Attorney, Agent, or Firm* — Bacon & Thomas, PLLC

(57) ABSTRACT

A 3D image cinema system having at least one projection room for viewing 3D images or 2D images is divided into forward and rearward viewing directions for the projection of an image on a front screen and a rear screen which are provided in a front end and a rear end of the projection room, respectively. Further, a front direction chair and a rear direction chair having a different viewing direction are provided on a front step and a rear step between the projection room and the front and rear screens where the theater can be easily installed in a general building and the 3D and 2D image has as much as 1.5-2 times wider viewing as a prior image.

5 Claims, 10 Drawing Sheets

Fig.10
(a)
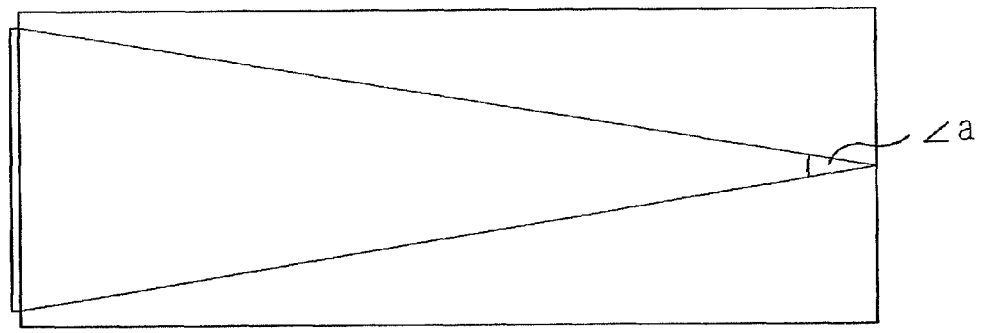
PRIOR ART
(b)
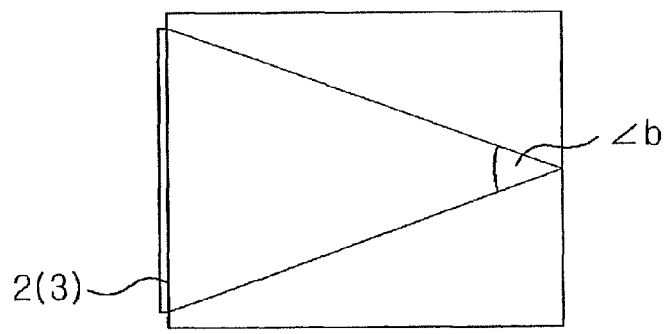

3D IMAGE CINEMA SYSTEM

CROSS-REFERENCE(S) TO RELATED APPLICATION

This application claims priority of Korean Patent Application No. 10-2011-0006109, filed on Jan. 21, 2011, in the Korean Intellectual Property Office, which is hereby incorporated by reference in its entirety.

BACKGROUND OF THE INVENTION

1. Field of the Invention

The present invention relates to a 3D image cinema system which is configured to have a projection room for projecting one image frontward and rearward, two screens arranged symmetrically frontward and rearward, and a chair which is configured to having front and rear viewing directions.

2. Description of the Related Art

In general, 3D images are viewed separately in such a manner that a left image of the 3D image is viewed through a left eye and a right image is viewed through a right eye, where the 3D images have very small picture sizes compared to a 2D image if viewed simultaneously as one image through a left and right eye.

Further, an inner height of a prior theater needs to be two times greater than that of a general building.

That is, as shown in FIG. 1, a height of theater chair arrangement is gradually increased in a stepped manner by about 20-25 centimeters, i.e., approximately 8-10 inches, and thus as a chair arrangement line increases, the chair arrangement height is increased wherein in case where the chair arrangement line increased to 8 steps, the inner space height of a theater is to be greater than 6 m.

Accordingly, the installation of theater facilities in existing residential and commercial buildings is difficult given that such building typically have ceiling heights of greater than 2 m, i.e., approximately 80 inches, but less than 5 m, approximately 200 inches. Thus the building having a special inner space, i.e., ceiling height, of being greater than 6 m has to be originally designed for the installing of theater facilities, and thereby increasing construction cost and limiting the theater installment places.

SUMMARY OF THE INVENTION

The present invention has been proposed to solve the drawback as described above and the present invention is directed to a 3D image cinema system in which a projection room is provided for projecting forward and rearward one image having two screens arranged symmetrically in forward and rearward directions based on the projection room, and stepped stairs provided between the projection room and the front and rear screens, and a chair for viewing frontward and rearward images.

Here, the inner part of the projection room is configured for the projection of frontward and rearward 3D images by having a semi-transparent mirror, a two-sided surface reflection mirror and a polarization plate between a left image projector and a right image projector to project separately the 3D image in front and rear directions.

Additionally, the two projectors arranged inside the projection room are combined into a projector for 3D image wherein the semi-transparent mirror and a reflection mirror are provide at an inclination angle in a front surface of the projector for projecting separately the 3D image in an opposing direction.

Furthermore, two active type 3D projectors are provided in the projection room for projecting separately the 3D image in both directions.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 10(a) is a perspective view of the left and right viewing angles on a screen provided in a prior theater; and FIG. 10(b) is a perspective view of the left and right viewing angles on a screen provided in a theater according to the present invention.

DETAILED DESCRIPTION OF EXEMPLARY EMBODIMENTS

Figure 1:
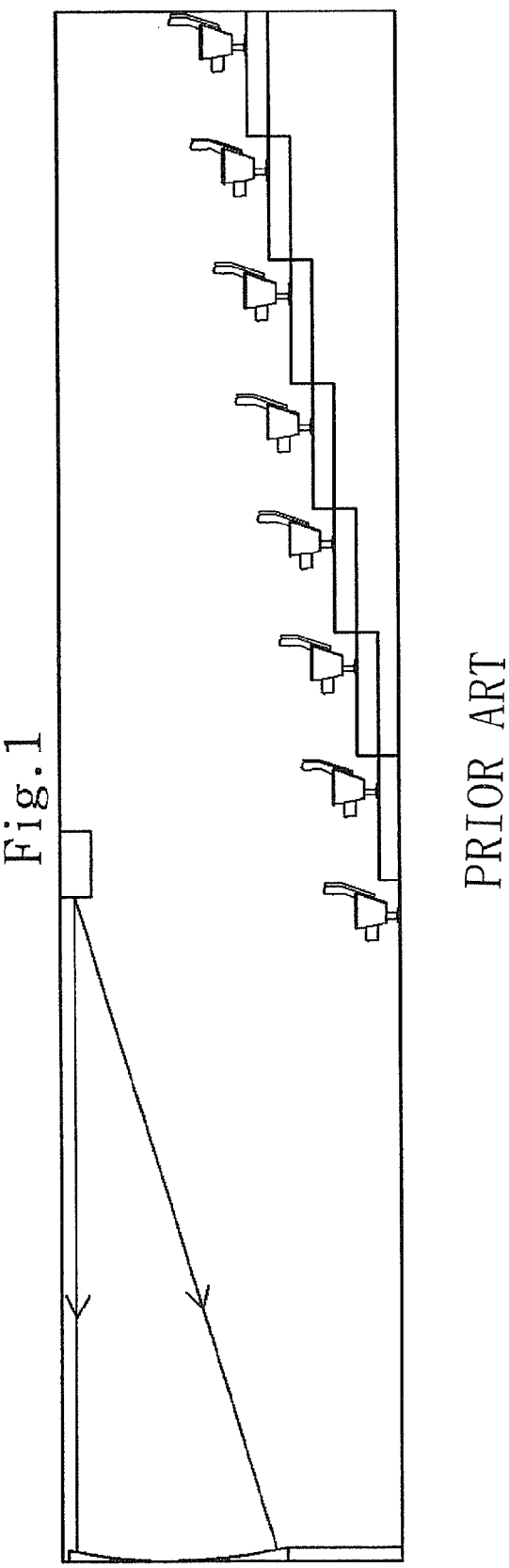
FIG. 1 is a perspective view of a prior theater.

Exemplary embodiments of the present invention will be described below in detail with reference to the accompanying drawings. Wherever possible, the same reference numerals will be used to refer to the same elements throughout the specification, and a duplicated description thereof will be omitted.

Figure 2:
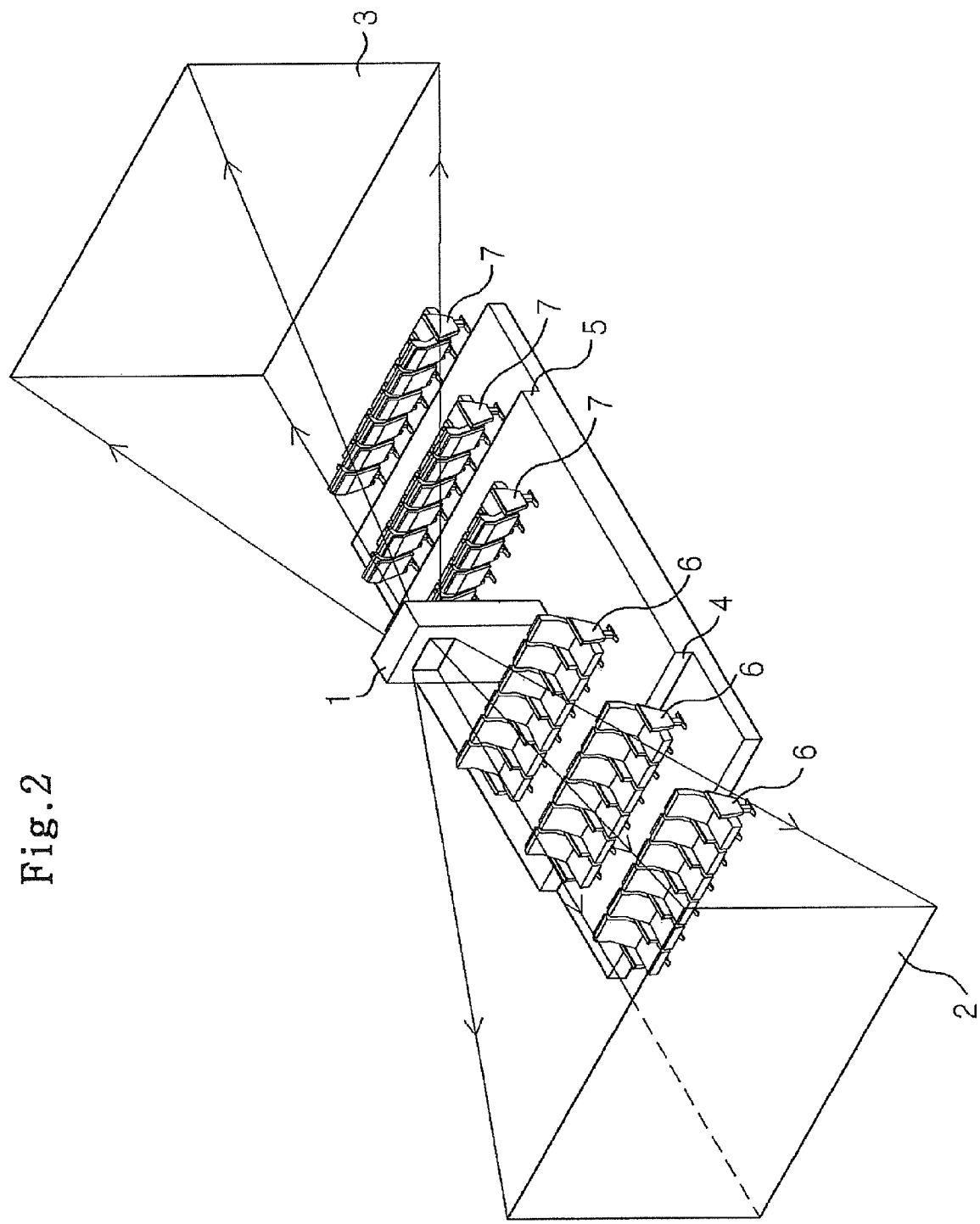
FIG. 2 is a perspective view of a theater configuration according to the present invention.
Figure 3:
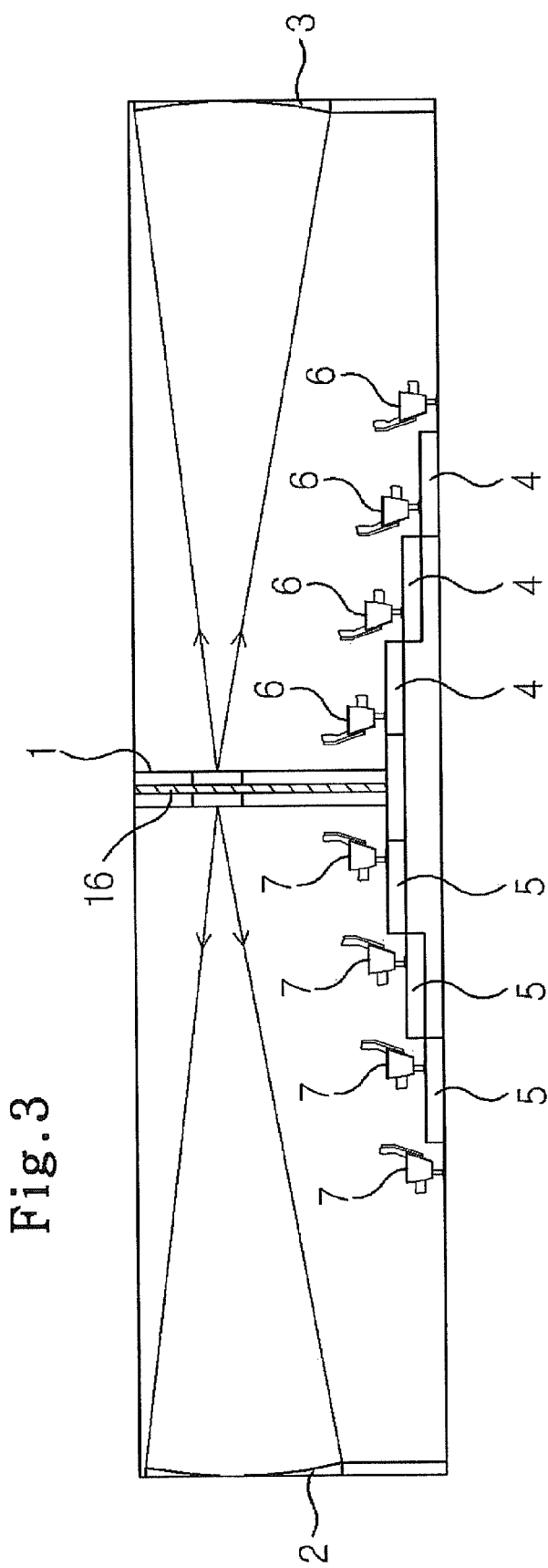
FIG. 3 is a side-sectional view of a theater configuration according to the present invention.

FIG. 2 is a perspective view of a theater configuration according to the present invention, and FIG. 3 is a side-sectional view of a theater configuration according to the present invention.

As shown in FIGS. 2 and 3, a projection room 1 is provided in a center area of a building and further a front screen 2 is provided at a front end of the projection room and a rear screen 3 is provided at a rear end of the projection room 1.

Meanwhile, a front directed step 4 is provided forward on the projection room 1 and a rear directed step 5 is provided rearward on the projection room 1 and then a front directed chair 6 is arranged on the front directed step 4 toward the front screen 2 and further a rear directed chair 7 is arranged on the front directed step 5 toward the rear screen 3.

Here, the front and rear directed steps 4, 5 are arranged at a height from the floor and are gradually lowered.

That is, the arrangement of the front screen 2, the front directed step 4 and the front directed chair 6 is symmetrical forward and rearward with that of the rear screen 3, the rear directed step and the rear directed chair 7, based on the projection room 1.

Further, the brightness of a general screen is 1 gain, and the brightness of the front screen 2 and the rear screen 3 is greater than 2 gain since one image is divided and projected forward and rearward into two parts in the projection room 1 and thus it needs to compensate the brightness.

A configuration of the projection room 1 is important since one image is divided and projected in forward and rearward directions on a front screen 2 and a rear screen 3.

Hereinafter, a method for dividing the projected forward and rearward images will be described, referring to exemplary embodiments.

However, it has to be understood that the present invention may be applied to 2D images in addition to 3D images and further the method for dividing and projecting forward and rearward the image may be implemented through various way and thus it is not limited the exemplary embodiments.

Embodiment 1

A left image projector 8a and a right image projector 8b are provided for projecting a left image and a right image.

Figure 4:
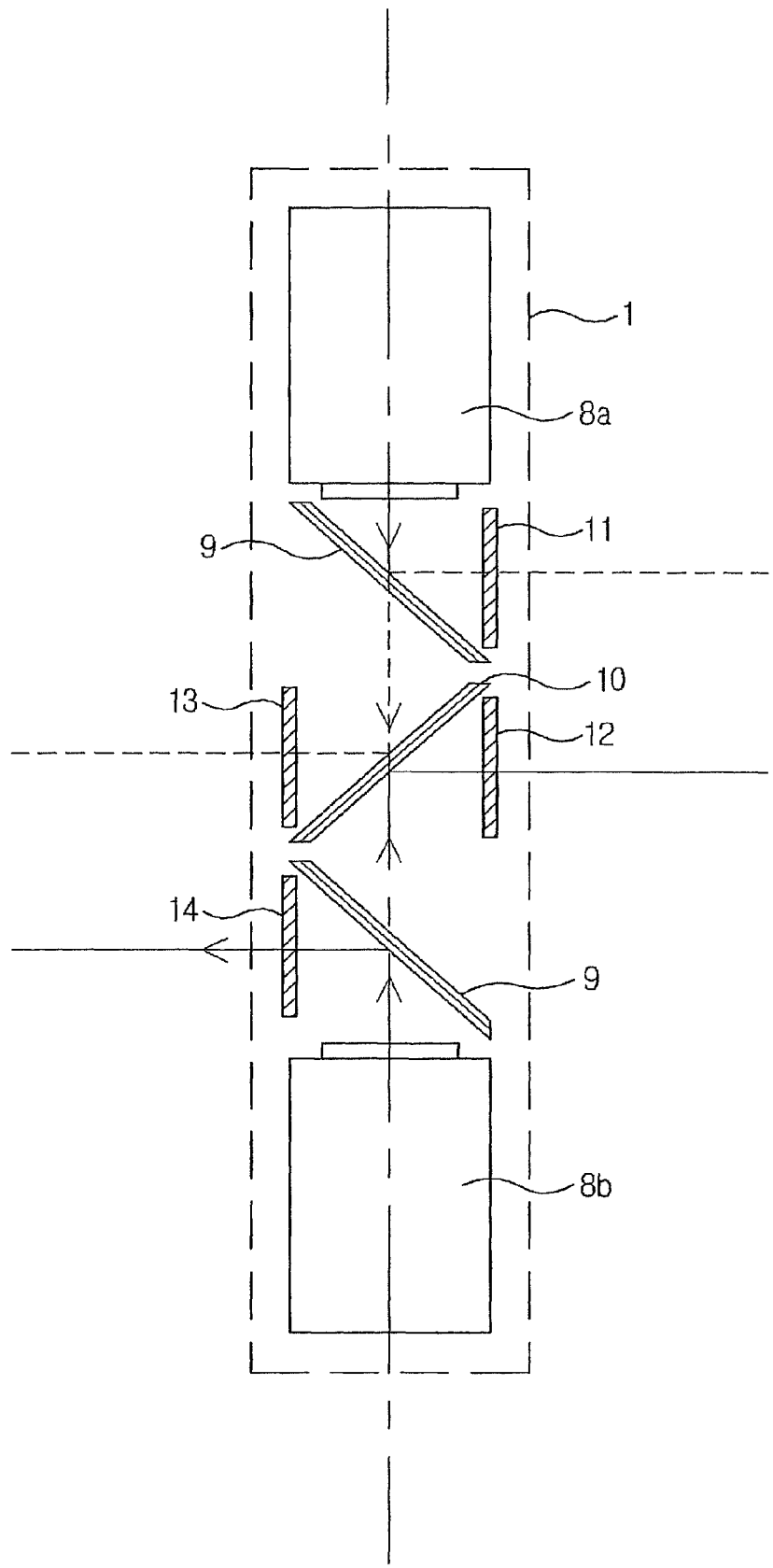
FIG. 4 is a perspective view of a front-rear both directional projection configuration of a projection room.

As shown in FIG. 4, the left image projector 8a and the right image projector 8b are provided left-right symmetrically inside the projection room 1, and further a semi-transparent mirror 9 through which 50% of the light is reflected and 50% of the light is transmitted is provided at an inclination angle in a front place of the respective left image projector 8a and the right image projector 8b and a two-sided reflection mirror 10 is provided between the semi-reflection mirrors 9 in an opposite inclination angle to the inclination angle of the semi-reflection mirror.

Further, the left-polarization filters 11, 14 are provided in a faced-reflection direction of the semi-transparent mirrors 9 and the right-polarization filters 12, 13 are provided in a front-rear surface of the two-sided surface mirror 10.

That is, the semi-transparent mirror 9 and the two-sided surface mirror 10 are arranged left-right symmetrically between the left and right image projectors 8a, 8b wherein the left and right image are divided and projected frontward and rearward, as shown in FIG. 4.

Through this arrangement of the semi-transparent mirror and the two-sided surface mirror, the frontward and rearward direction of the left and right image are both viewable on a viewing direction on the respective screen when they are projected on the front screen 2 and the rear screen 3.

Figure 5:
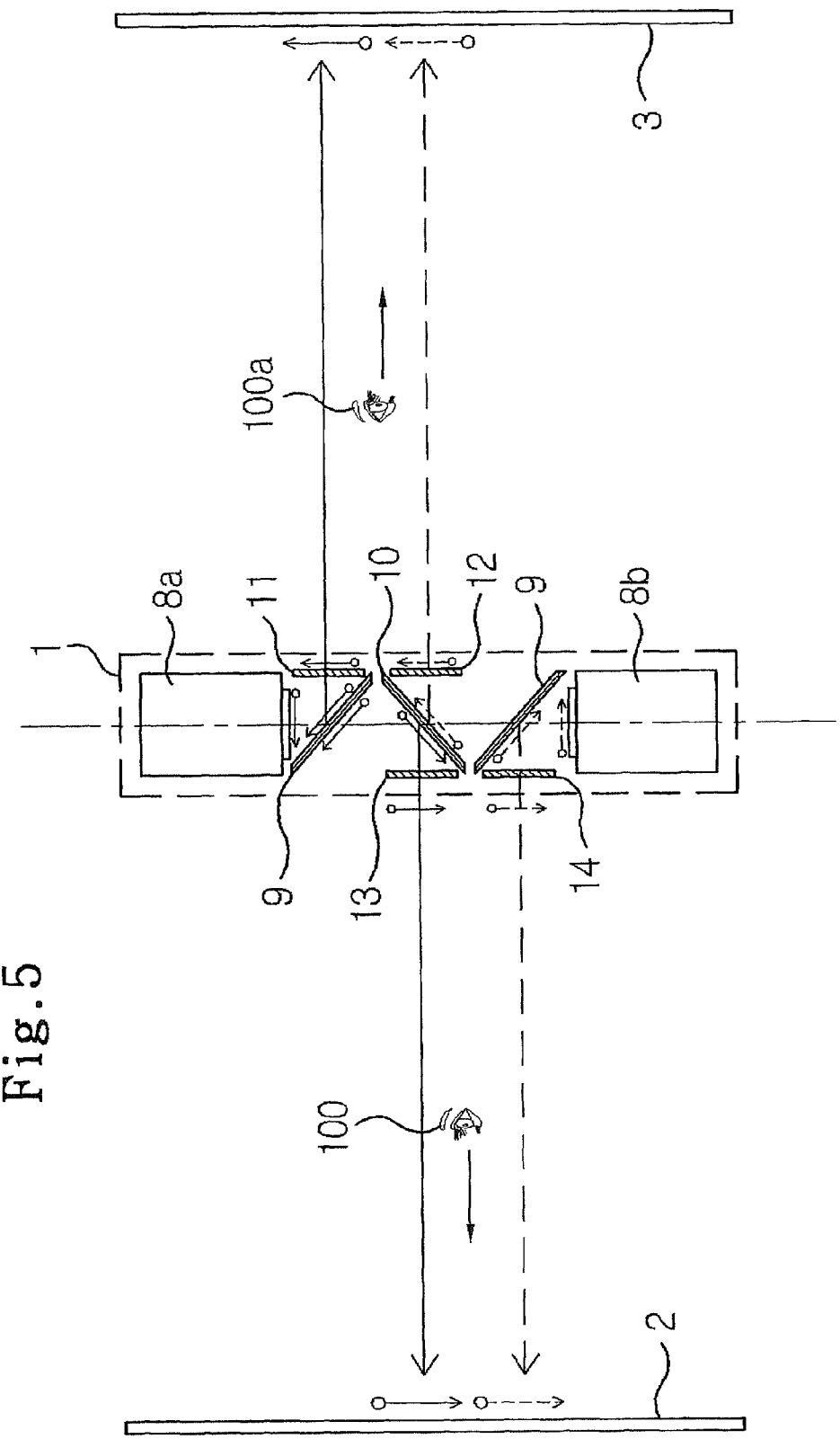
FIG. 5 is a perspective view of a front-rear directional projection configuration of a projector provided in the projection room.

As shown in FIG. 5, half of the left image from the left projector 8a is reflected through the semi-transparent mirror 9 to be projected toward the rear screen 3 and the rest of the left image from the left projector is transmitted to be reflected partly from one surface of the two-sided surface mirror 10 to be projected on the front screen 2.

Half of the right image from the right projector 8b is reflected to be projected on the front screen 2 and the rest of the right image from the right projector 8b is transmitted to be projected on the rear screen 3.

That is, the 50% of the transmitted light of the left image projector 8a and the 50% of the transmitted light of the right image projector 8b are projected on the rear screen 3 through the left polarization filter 11 and the right polarization filter 12, and half of the light from the right image projector 8b and half of the light from the left image projector 8a are projected on the front screen 2 through the left polarization filter 14 and the right polarization filter 13.

That is, through the procedures as described above, as shown in FIG. 5, frontward and rearward direction of the right image from the right image projector 8b which is reflected from the semi-transparent mirror 9 among the 3D images formed on the rear screen 3 is identical to the frontward and rearward direction of the left image which is transmitted from the left image projector 8a to the semi-transparent mirror 9 and is reflected from the two-sided surface reflection mirror 10.

In a similar principle, the frontward and rearward direction of the image from the left image projector 8a which is formed on the front screen 2 and the frontward and rearward direction of the image from the right image projector 8b are identical to each other.

Accordingly, the viewers each 100, 100a from a front and rear direction can view the 3D image having the same left-right image on the front and rear screen 2, 3 even when the viewing direction is changed frontward and rearward.

Embodiment 2

Through a similar principle, in the projection room 1 according to the present invention, as shown in FIG. 6(a), an active type 3D projector 8d is arranged forward and rearward symmetrically and a two-sided surface reflection mirror 10 is provided at an inclination angle in a front surface of the active type 3D projector.

Accordingly, one image is input into the front and rear 3D projectors 8d and is projected frontward and rearward on the front screen 2 and the rear screen 3 from the two-sided surface reflection mirror 10.

Embodiment 3

As shown in FIG. 6(b), two projectors 81d, 82d are arranged in a top and bottom manner and the left and right polarization filters 11, 12 are provided in a front surface of the projector to form a 3D projector wherein the 3D projector is arranged leftward and rightward symmetrically and further the both surface mirror 10 is provide between the 3D projectors for the image to be projected on the front and rear screens 2, 3.

That is, the embodiments 1, 2, 3 disclose that, as shown in FIGS. 4 and 6(a), the respective projection lenses mounted to two projectors are formed as facing each other.

Embodiment 4

Figure 7:
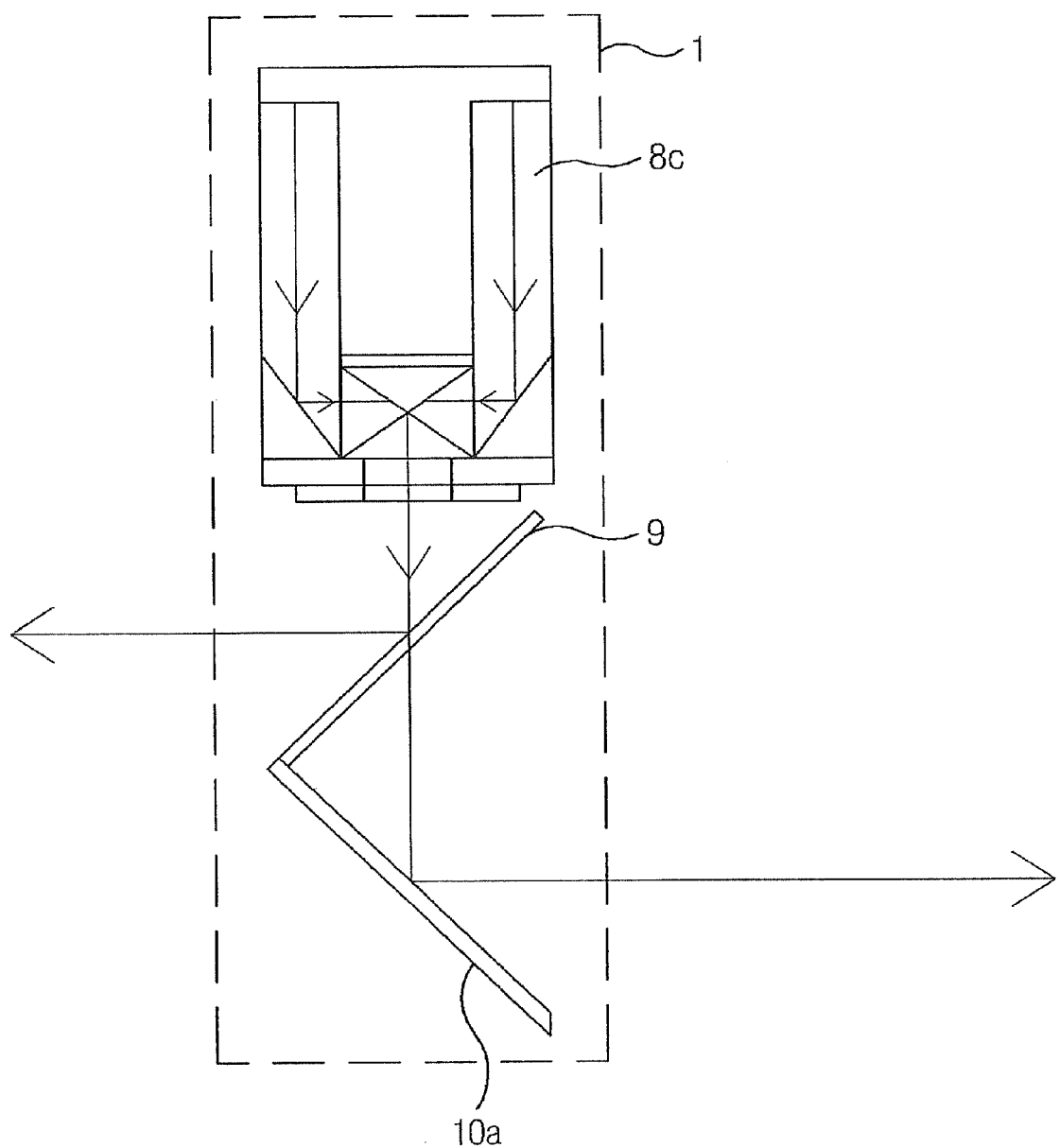
FIG. 7 is a perspective view of a third embodiment of a projection room configuration according to the present invention.

As shown in FIG. 7, a known 3D projector 8c is configured in such a manner that two projection engines are provided in one projector and the left and right images are projected simultaneously through one projection lens wherein the semi-transparent mirror 9 is arranged at an inclination angle in a front end of the 3D projector and a reflection mirror 10a is provided in a front end of the semi-transparent mirror at an opposite inclination angle to the inclination angle of the semi-transparent mirror.

50% of the light is reflected from the semi-transparent mirror 9 with respect to image from the 3D projector 8c that is projected on the front screen 2, and the remaining of the 50% light is transmitted through the semi-transparent mirror 9 and reflected from the reflection mirror 9 to be projected on the rear screen 2.

In a similar principle, the image from an active type 3D projector is divided forward and rearward directions for 2D image and 3D image to be projected separately on the front and rear screen 1, 3.

Embodiment 5

Figure 6:
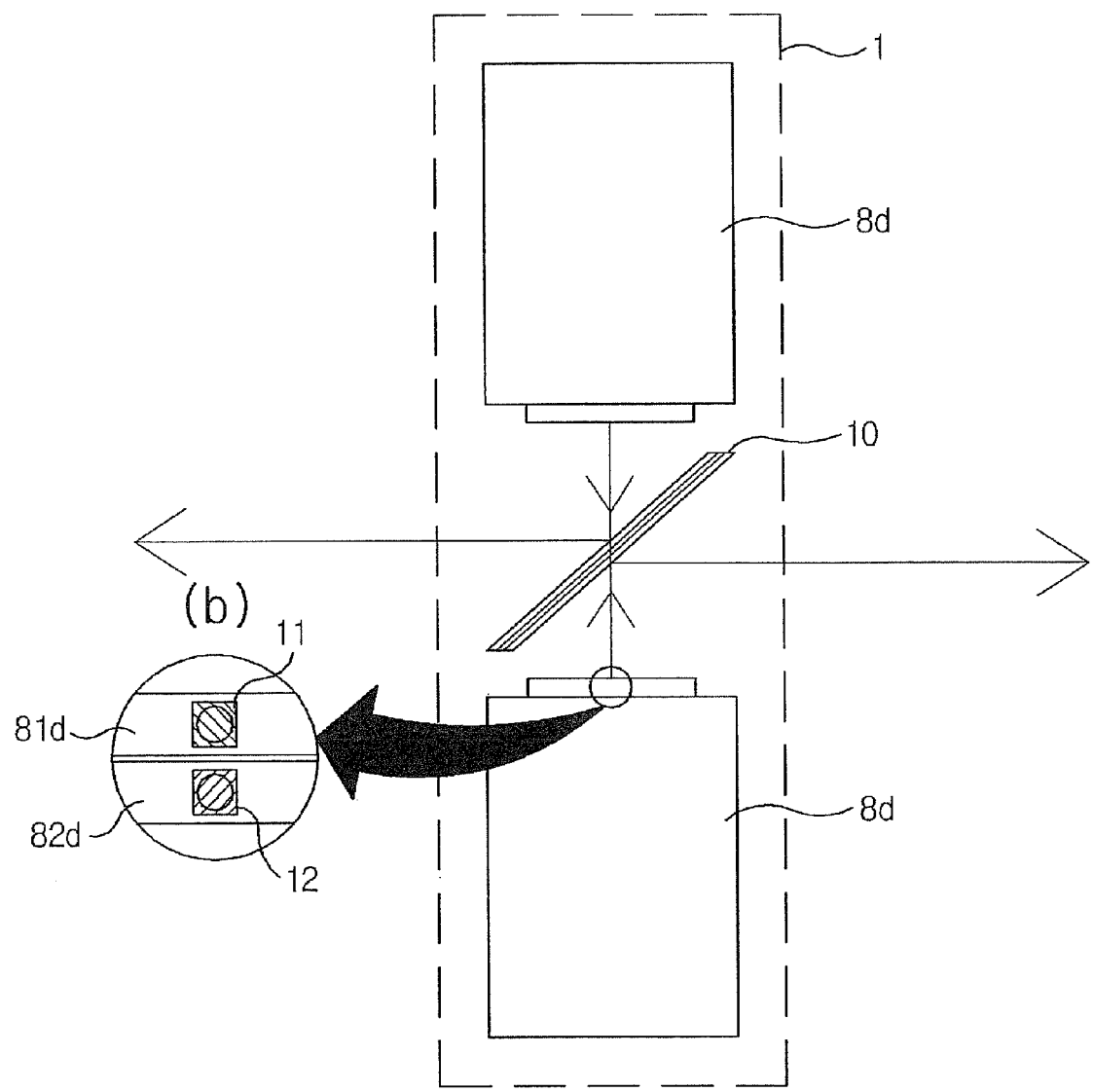
FIG. 6 is a perspective view of a secondary embodiment of a projection room configuration according to the present invention.

In a similar principle, the configurations of a 3D image cinema system as shown in FIGS. 6 and 7, may be applied to a 2D image projector and in this case the wide image having a enlarged viewing angle as 1.5-2 times as a prior 2D image can be viewed on the front and rear screen 2, and thus it can be applied efficiently to a sports theater for broadcasting sports.

Embodiment 6

Figure 8:
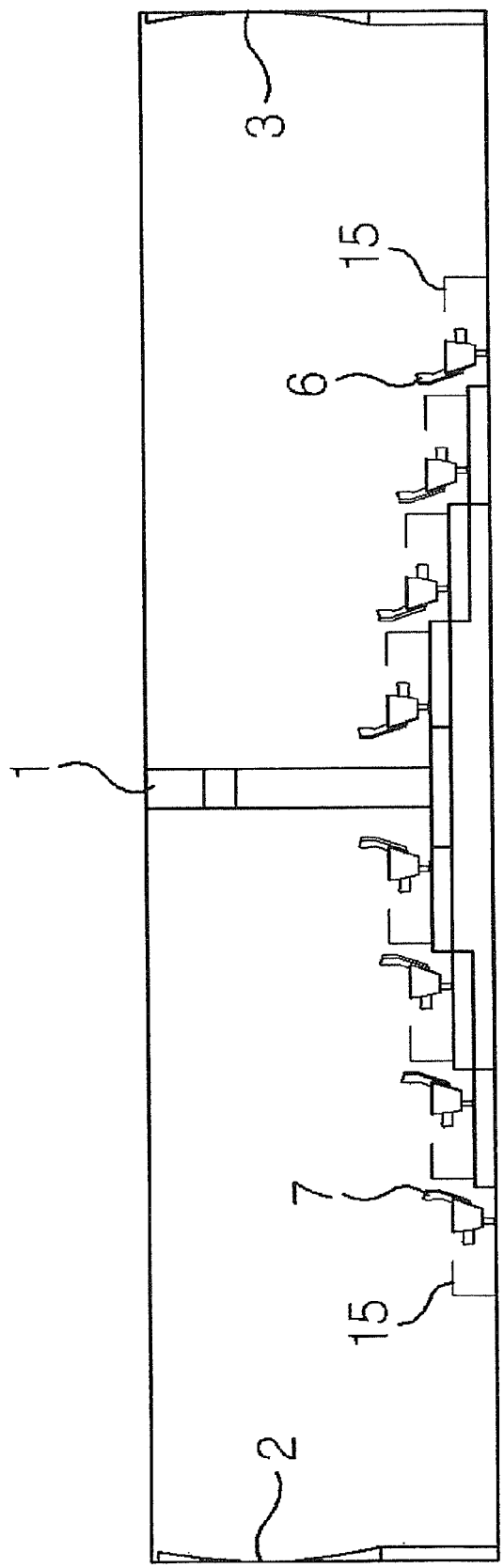
FIG. 8 is a perspective view of an embodiment of a theater provided with a table.

The 3D image cinema system according to the present invention, as shown in FIG. 8, has a table 15 that can be provided in a front area of the front and rear direction chairs 5, 6 wherein the room may be used as a theater type restaurant or a theater beer café.

Embodiment 7

The 3D image cinema system according to the present invention, as shown in FIG. 3, has a sound blocking plate 16 which is to be opened and closed that can be provided in the projection room 1 and when the sound blocking plate 16 is raised, so that the same movie is projected simultaneously on the front and rear screens 2, 3 in one projection room, and when the sound blocking plate 16 is lowered, a front and rear theaters are operated separately in one projection room 1. In this case, the projection room 1 may be configured as in FIG. 6.

The 3D image cinema system according to the present invention, as shown in FIGS. 2 and 3, one 3D image or 2D image is divided in forward and rearward directions to be projected on the front screen 2 and the rear screen 3 wherein a front direction chair 6 and a rear direction chair 7, and a front screen 2 and a rear screen 3 are provided symmetrically on a front direction step 6 and a rear direction step 7, respectively, toward a front viewing direction and a rear viewing direction based on the projection room 1 and thus it may be easily arranged in a general building.

Figure 9:
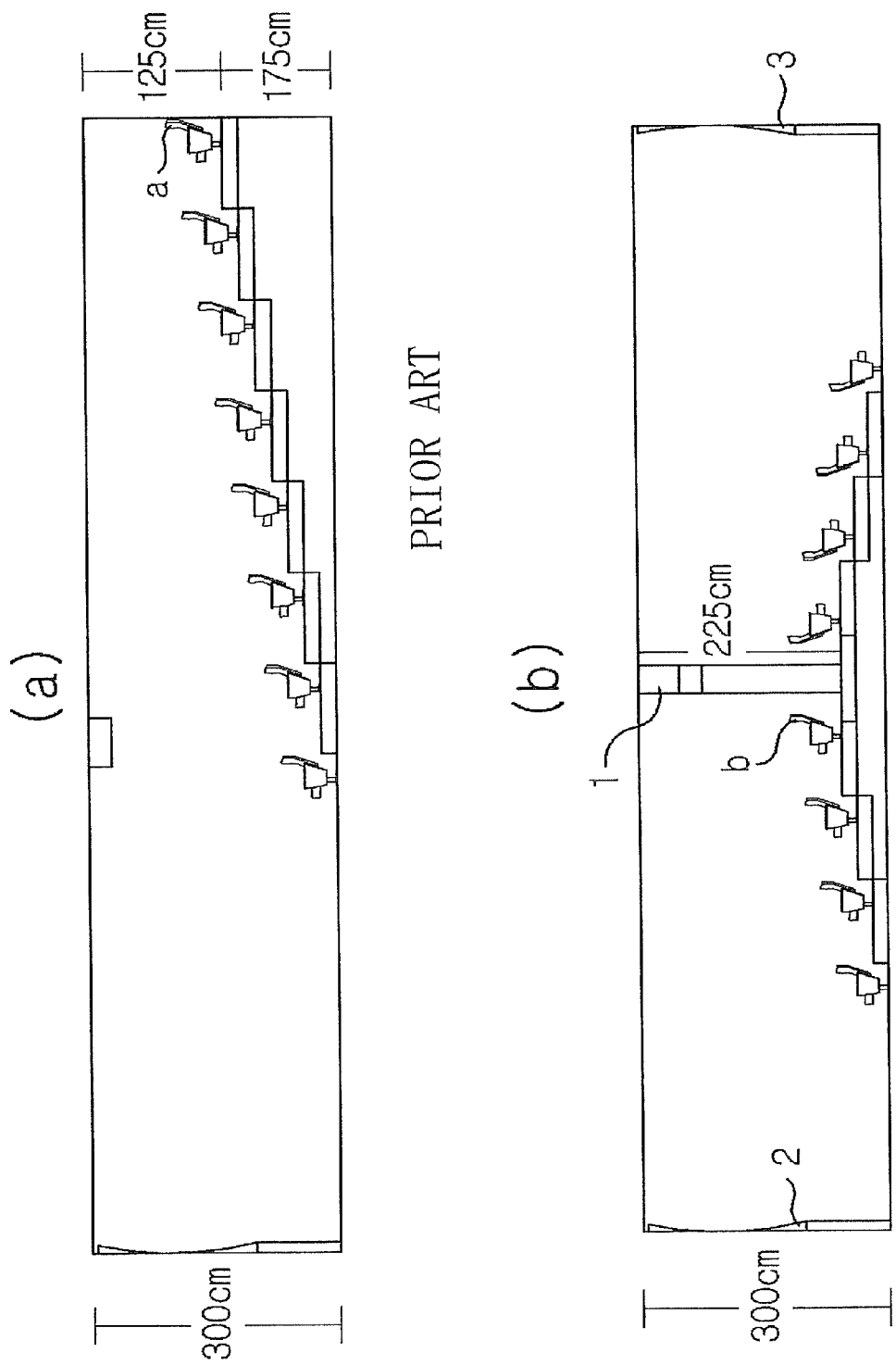
FIG. 9(a) is a perspective view of a chair configuration provided in a prior theater and an inner space height thereof.
FIG. 9(b) is a perspective view of a chair configuration and an inner space height of a theater according to the present invention.

That is, as shown in FIG. 9(*a*), for example, in a space height of 300 cm, when each step height is 25 cm as 8 steps and then the height from a floor of the final 8th chair to a ceiling is 175 cm, a height of the rest space is 125 cm, and viewer can walk through the rest space.

However, as shown in FIG. 9(*b*), according to the configuration of the present invention, since the chairs are arranged forward and rearward directions, even when the chairs are arranged in the 8$^{th}$ rows, and each step height is 25 cm as the same as the general building, the height from the chair to a ceiling is 75 cm, and then the rest space height is 225 cm and thus it may be arranged inside a general building.

Accordingly, the 3D image cinema system according to the present invention may be arranged inside a general building in addition to a building having a special area and thereby forming a theater configuration, not limiting to a space and a location.

As shown in FIG. 10(*a*), a left and right viewing angle (∠a) is an angle at which a viewer seating on the uppermost chair b as shown in FIG. 10(*b*) views the image on the screen, and a left and right viewing angle (∠b) is as 1.5-2 times as wide as the viewing angle (∠a) as shown in FIG. 10(*a*), and thus a wider screen image can be viewed.

Further, the front and rear screen 2, 3 is configured to have greater than 2 gains, comparing to 1 gain of a prior screen, and thus a decrease in the brightness of the image is avoided even with the dividing of the image into forward and rearward images.

The configuration of a theater as discussed having symmetrical frontward and rearward viewing directions decreases a theater area based on a viewing direction, compared to a prior theater configuration, and thus cubic sound can be listened evenly throughout viewings in the chairs.

Accordingly, according to the 3D image cinema system of the present invention, the left and right viewing angles are enlarged as much as 1.5-2 times more than the prior screen to compensate for narrowed left and right viewing angles due to 3D imaging and viewing wider 3D images. Further, the sound blocking plate 16 arranged on a middle of two screen configurations as the front screen 2 and the rear screen 3 in one projection room 1 is opened and closed and thus it may be used as a single theater or two theaters and thereby enabling additional cost savings.

In case where 2D image is projected though the 3D image cinema system according to the present invention, the image that is as much as 1.5-2 times wider than prior screens can be viewed.

Furthermore, the 3D image cinema system according to the present invention may be arranged in a building having a general height and thus a special building for a theater is not necessary, thereby saving installation costs and not limiting the installation to a specific installment location.

Accordingly, the 3D image cinema system according to the present invention may be applied to a 3D image theater, 2D image theater to have a wider viewing angle, and a sport theater or theater type restaurant.

According to the present invention, a 3D image and a 2D image can be divided separately in one projection room (1) to be projected separately on two screens.

Further, according to the present invention, when the chairs are arranged in a stepping manner inside a general building to provide more than 2 times larger viewing area than that of prior systems and thus it may be installed inside a general building in addition to a special building and the place and location for installing the 3D image cinema system are not limited.

Meanwhile, since a chair for a viewer is arranged at a place where a left and right viewing angles are enlarged to 1.5-2 times more than the screens as the prior arrangement of the chairs, a 1.5-2 times wider image can be viewed. In addition, the 3D image cinema may be applied to 2D image in addition to 3D image, and through which a 1.5-2 times wide image as a prior system can be viewed.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A 3-D image cinema system configured to be installable in a building having a ceiling height between 2-5 meters, said 3-D image cinema system comprising:

a projection room having a front portion and a rear portion, said projection room being configured to receive projection of frontward and rearward images from a projector;

a front screen positioned at the front portion of the projection room and a rear screen positioned at the rear portion of the projection room;

at least one frontward facing chair arranged to face the front screen and at least one rearward facing chair arranged to face the rear screen in opposing viewing directions, said frontward facing chair and rearward facing chair being arranged between the projector and front screen and rear screen, respectively; and a 3D projection system comprising a first projector configured to project a left image of a 3-D image and a second projector configured to project a right image of the 3-D image provided inside the projection room, said first projector and second projector facing each other, and at least two semi-transparent mirrors and a two-sided surface reflection mirror provided between the first projector and the second projector, each of said at least two semi-transparent mirrors arranged at an angle so that each semi-transparent mirror reflects 50% of light projected from the respective first and second projector in the frontward and rearward directions, respectively, and transmits 50% of the light through the semi-transparent mirror, and said two-sided surface reflection mirror being arranged at an angle so that the transmitted light through each semi-transparent mirror is reflected in the frontward and rearward directions so that the 3-D image is projectable in opposite directions towards the front screen and the rear screen simultaneously.

2. The 3-D image cinema system according to claim 1, further comprising a front direction step and a rear direction step between the projector and the front and rear screen, respectively, wherein said at least one frontward facing chair is provided on the front direction step and the at least one rearward facing chair is provided on the rear direction step in a stepping manner so that the at least one frontward facing chair and the at least one rearward facing chair are arranged symmetrically in the projection MOM.

3. The 3-D image cinema system of claim 1, further comprising a sound blocking plate provided in the projection room configured to separate the projection room so that the sound blocking plate is enabled to block sound from the front portion and the rear portion of the projection room.

4. The 3-D image cinema system of claim 1, wherein said frontward and rearward facing chairs comprise a table provided at a front surface of the chairs.

5. The 3-D image cinema system of claim 1, further comprising two sets of two polarization plates in front of the at least two semi-transparent mirrors and two-sided surface reflection mirror, wherein each set of two polarization plates are arranged in a way to polarize the images projected in the forward and rearward directions, respectively.

\* \* \* \* \*